(12) United States Patent
Ishikawa

(10) Patent No.: US 10,883,589 B2
(45) Date of Patent: *Jan. 5, 2021

(54) TWO STRESS-SEPARATION STRAIN WAVE GEARING

(71) Applicant: HARMONIC DRIVE SYSTEMS INC., Tokyo (JP)

(72) Inventor: Shoichi Ishikawa, Yokohama (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 274 days.

This patent is subject to a terminal disclaimer.

(21) Appl. No.: 15/112,467

(22) PCT Filed: Dec. 4, 2015

(86) PCT No.: PCT/JP2015/084198
§ 371 (c)(1),
(2) Date: Jul. 19, 2016

(87) PCT Pub. No.: WO2017/094195
PCT Pub. Date: Jun. 8, 2017

(65) Prior Publication Data
US 2018/0259053 A1 Sep. 13, 2018

(51) Int. Cl.
*F16H 49/00* (2006.01)
*F16H 55/08* (2006.01)
(Continued)

(52) U.S. Cl.
CPC .............. *F16H 49/001* (2013.01); *F16H 1/32* (2013.01); *F16H 55/08* (2013.01); *F16H 55/0833* (2013.01); *F16H 3/70* (2013.01)

(58) Field of Classification Search
CPC .... F16H 49/001; F16H 55/08; F16H 55/0833; F16H 1/32; F16H 3/70; F16H 2049/003
See application file for complete search history.

(56) References Cited

U.S. PATENT DOCUMENTS 2,906,143 A 9/1959 Walton
4,823,638 A 4/1989 Ishikawa
(Continued)

FOREIGN PATENT DOCUMENTS

JP 45-41171 B 12/1970
JP 63-115943 A 5/1988
(Continued)

OTHER PUBLICATIONS

International Search Report (PCT/ISA/210) dated Mar. 1, 2016, by the Japanese Patent Office as the International Searching Authority for International Application No. PCT/JP2015/084198.

(Continued)

*Primary Examiner* — Victor L MacArthur
(74) *Attorney, Agent, or Firm* — Buchanan Ingersoll & Rooney PC

(57) ABSTRACT

In a strain wave gearing, the addendum tooth profile of an inner gear is defined by a formula and that of an outer gear is by another formula at a principal cross-section located at a tooth-trace-direction center of the outer gear, on the basis of a movement locus (Mc) of κ=1 by the teeth of the outer gear with respect to those of the inner gear. The tooth profiles of the dedenda of each of the inner gear and the outer gear are set to any shape that does not interfere with the tooth profile of the addendum of the other gear. It is possible to avoid superimposed flexion-induced bending stresses and tensile stresses caused by load torque arising at the long-axis locations of the outer gear, and the transmission torque capacity of a strain wave gearing can be improved.

6 Claims, 14 Drawing Sheets

(51) Int. Cl.
*F16H 1/32* (2006.01)
*F16H 3/70* (2006.01)

(56) References Cited

U.S. PATENT DOCUMENTS

| | | | |
|---|---|---|---|
| 4,974,470 | A | 12/1990 | Ishikawa et al. |
| 5,918,508 | A * | 7/1999 | Ishikawa ............ F16H 55/0833 |
| | | | 475/180 |
| 2003/0159539 | A1 | 8/2003 | Ishikawa |
| 2007/0266819 | A1 | 11/2007 | Ishikawa et al. |
| 2011/0237382 | A1 | 9/2011 | Ishikawa |
| 2014/0217855 | A1* | 8/2014 | Shibamoto ............ F16H 49/001 |
| | | | 310/339 |
| 2014/0345406 | A1* | 11/2014 | Ishikawa ............ F16H 55/0833 |
| | | | 74/412 R |
| 2016/0003338 | A1 | 1/2016 | Ishikawa |

FOREIGN PATENT DOCUMENTS

| | | |
|---|---|---|
| JP | 64-79448 A | 3/1989 |
| JP | 4165810 B2 | 10/2008 |
| JP | 4650954 B2 | 3/2011 |
| JP | 2011-144916 A | 7/2011 |
| WO | WO 2010/070712 A1 | 6/2010 |
| WO | WO 2015/079576 A1 | 6/2015 |

OTHER PUBLICATIONS

Written Opinion (PCT/ISA/237) dated Mar. 1, 2016, by the Japanese Patent Office as the International Searching Authority for International Application No. PCT/JP2015/084198.

* cited by examiner (a)

(b)

TWO STRESS-SEPARATION STRAIN WAVE GEARING

TECHNICAL FIELD

The present invention relates to a strain wave gearing, in which a flexible outer gear is induced by a wave generator to flex to an ellipsoidal shape and partially mesh with a rigid outer gear. More specifically, the invention relates to a strain wave gearing which avoids superimposition of bending stress produced due to flexion, and tensile stress caused by load torque due to meshing with the inner gear, in sections at either end of the long axis of the ellipsoidal shape of the outer gear, and which is aimed at improving the transmission torque capacity.

BACKGROUND ART

A strain wave gearing typically has a rigid inner gear, a flexible outer gear coaxially arranged to the inside thereof, and a wave generator set to the inside thereof. A flat type strain wave gearing is provided with an outer gear having outer teeth formed on an outer peripheral surface of a flexible cylinder. The outer gear of a strain wave gearing having a cup or top hat profile is provided with a flexible cylindrical barrel part, a diaphragm extending in a radial direction from a back end of this cylindrical barrel part, and outer teeth formed in an outer peripheral surface section at the front end opening side of the cylindrical barrel part. In a typical strain wave gearing, a circular outer gear is ellipsoidally flexed by a wave generator, and sections at either end of the long axis of the outer gear ellipsoidally flexed mesh with an inner gear.

Since the invention of the strain wave gearing by its creator, C. W. Musser (Patent Document 1), up to the present day, various inventions based on the present device have been contrived by numerous researchers, including Mr. Musser, and the present inventor. Even limiting the scope to inventions relating to tooth profile, various inventions devised. The present inventor, in Patent Document 2, proposed to adopt an involute tooth profile as the basic tooth profile, and in Patent Documents 3 and 4 proposed a tooth profile design method for deriving addendum tooth profiles of an inner gear and an outer gear for wide-area contact, using a process of approximating meshing of the two gears by rack meshing.

In strain wave gearings, a flexible outer gear is flexed from a true circular state to an ellipsoidal shape by a wave generator, and therefore bending stress due to flexing is produced in sections at either end of the long axis of the ellipsoidal shape. Once ellipsoidally flexed, an outer gear will mesh with the inner gear in these sections at either end of the long axis, thereby giving rise to tensile stress caused by load torque transmitted via the meshing sections. For this reason, high stress is visited on the sections at either end of the long axis of the outer gear (root rim sections), due to the two stresses being superimposed. As is particularly so with a low-gear-ratio strain wave gearing in which both gears have a small number of teeth, there is appreciable flexion of the outer gear at the locations on the long axis; therefore, strong bending stress is produced in association with the ellipsoidal deformation. Therefore, in order to improve the transmission torque capacity of a strain wave gearing, it is necessary to reduce the stresses produced in the sections at either end of the long axis of the outer gear.

In order for stresses produced in sections at either end of the long axis of the outer gear to be reduced in the prior art, the maximum radial flexion (radial flexion at the long axis location) when the outer gear is ellipsoidally deformed was set to a flexion $\kappa mn$ ($\kappa < 1$) less than a standard normal flexion $mn$, where $n$ is a positive integer, and the difference in the number of teeth between the gears is $2n$. $m$ is the module of the two gears. $\kappa$ is a coefficient known as the coefficient of deflection (or the coefficient of flexion); cases of flexion $nm$ such that flexion in the radial direction is $\kappa = 1$ (normal flexion), are called "non-deflection flexing," cases of flexion in the radial direction that is less than $\kappa nm$ ($\kappa < 1$) are called "negative deflection flexing," and cases of flexion in the radial direction that is greater than $\kappa nmn$ ($\kappa > 1$) are called "positive deflection flexing."

By having the outer gear set to negative deflection flexing, bending stress associated with ellipsoidal deformation arising in stresses produced in the sections at either end of the long axis of the outer gear is reduced. Additionally, by setting the outer gear to negative deflection flexing, the center of meshing of the outer gear with respect to the inner gear is shifted from the sections at either end of the long axis, thereby reducing tensile stress caused by load torque produced in the sections at either end of the long axis of the outer gear. Thus, by setting flexion to negative deflection, bending stress caused by flexion in the sections at either end of the long axis of the outer gear is reduced, and superimposition of bending stress and tensile stress is avoided. A strain wave gearing set to negative deflection flexing was proposed by the present inventor in Patent Documents 5 and 6, for example.

PRIOR ART DOCUMENTS

Patent Documents

Patent Document 1: U.S. Pat. No. 2,906,143
Patent Document 2: JP 45-41171 B
Patent Document 3: JP 63-115943 A
Patent Document 4: JP 64-79448 A
Patent Document 5: JP 4650954 B
Patent Document 6: JP 4165810 B

DISCLOSURE OF THE INVENTION

Problems to be Solved by the Invention

In a strain wave gearing, the tooth depth of the two gears relates to the flexion, and where radial flexion is negative deflection flexing ($\kappa mn$, $\kappa < 1$), which is less than the normal deflection flexing ($=mn$, $\kappa = 1$), the tooth depth becomes smaller. The smaller tooth depth poses a risk that ratcheting (tooth jumping) will occur during high load torque. In order to prevent ratcheting, it is necessary to make the tooth depth of the two gears as large as possible.

From this standpoint, it would be desirable to be able to separate the superimposition of bending stress and tensile stress produced in the sections at either end of the long axis of the outer gear when ellipsoidally deformed, while maintaining normal deflection flexing without making the flexion smaller. However, no rigorous examination has been made into ways to actively separate superimposition of bending stress and tensile stress produced in sections at either end of the long axis of the outer gear.

An object of the present invention is to provide a strain wave gearing with which superimposition of bending stress and tensile stress produced in sections at either end of the long axis of an outer gear can be avoided, without making the flexion of the outer gear (the average flexion of flexion at each location in the tooth trace direction) smaller than the normal flexion.

Means Used to Solve the Above-Mentioned Problem

In order to solve the above-mentioned problem, in the present invention, the two stresses (bending stress and tensile stress) are separated by making necessary corrections to the tooth profile of the flexible outer gear of a strain wave gearing.

Specifically, the strain wave gearing of the present invention is characterized by having a rigid inner gear, a flexible outer gear arranged coaxially to the inside of the rigid inner gear, and a wave generator fitted inside the flexible outer gear;

the outer gear being ellipsoidally flexed by the wave generator, the outer teeth of the ellipsoidally flexed outer gear meshing with the inner teeth of the inner gear in proximity to sections at either end in the long axis direction of the ellipsoidally flexed outer gear;

the inner gear, and the outer gear prior to ellipsoidal deformation, both being spur gears of module m;

the number of teeth of the outer gear being fewer by 2n than the number of teeth of the inner gear, where n is a positive integer;

at a long axis location on an ellipsoidal rim neutral curve of the outer gear in an axis-perpendicular cross-section at a prescribed location lying in the tooth trace direction of the outer gear, radial flexion with respect to the rim neutral circle prior to flexion being 2κmn, where κ is a deflection coefficient, and where an axis-perpendicular cross-section established at a prescribed location lying in the tooth trace direction of the outer gear is taken as a principal cross-section, the principal cross-section being a non-deflection flexing cross-section in which the deflection coefficient κ=1;

on the basis of a movement locus of κ=1 by the teeth of the outer gear with respect to the inner gear, where meshing of the outer gear with respect to the inner gear in the principal cross-section is regarded as rack meshing, the tooth profile of the addendum of the inner gear being specified by the following formula a:

$x_{Ca} = 0.25$ mn $(\pi + \theta - \sin\theta)$ $y_{Ca} = 0.5$ mn $(-1 + \cos\theta)$ (formula a)

where $0 \leq \theta \leq \pi$, the tooth profile of the addendum of the outer gear being specified by the following formula b:

$x_{Fa} = 0.25$ mn $(\pi - \theta + \sin\theta - \varepsilon \cos(\theta/2))$ $y_{Fa} = 0.5$ mn $(1 - \cos\theta)$ (formula b)

where $0 \leq \varepsilon \leq 0.1$ and $0 \leq \theta \leq \pi$; and the tooth profiles of the dedenda of each of the inner gear and the outer gear being set to any shape that does not interfere with the tooth profile of the addendum of the other gear.

In the case of a flat type strain wave gearing, the tooth profile of the addendums of the inner gear, in axis-perpendicular cross-sections thereof to the tooth trace direction, is defined by the above formula a, and the profile of the addendums of the outer gear, in axis-perpendicular cross-sections thereof to the tooth trace direction, is defined by the above formula b.

In the case of a cup type strain wave gearing or a top-hat-type strain wave gearing, the outer gear is equipped with a flexible cylindrical barrel part, and a diaphragm extending in a radial direction from the back end of this cylindrical barrel part, the outer teeth being formed in an outer peripheral section at the front open end side of the cylindrical barrel part. The amount of flexion of the outer teeth changes in proportion to the distance from the diaphragm from the outer tooth inner end at the diaphragm side towards the outer tooth open end at the front end opening side in the tooth trace direction, and the principal cross-section is located at the tooth-trace-direction center between the outer teeth open end portion and the outer teeth inner end portion of the outer teeth.

In this case, the tooth profile of the outer gear in the principal cross-section is defined by an addendum profile that is defined by the aforementioned formula b. The tooth profile in axis-perpendicular cross-sections, other than the principal cross-section, in the tooth trace direction in the outer gear are shifted profiles in which the tooth profile of the principal cross-section is subjected to shifting according to the amount of flexion of each of the axis-perpendicular cross-sections. Specifically, the tooth profiles of axis-perpendicular cross-sections of the tooth trace direction, from the principal cross-section to the outer tooth open end of the outer gear, are obtained by subjecting the tooth profile of the principal cross-section to shifting, in such a way that apex portions of the κ>1 movement locus described by the tooth profile in each of the axis-perpendicular cross-sections contact apex portions of the κ=1 movement locus in the principal cross-section. The tooth profiles of axis-perpendicular cross-sections of the tooth trace direction, from the principal cross-section to the outer tooth inner ends of the outer gear, are obtained by subjecting the tooth profile of the principal cross-section to shifting, in such a way that nadir portions of the κ<1 movement locus described by the tooth profiles in the axis-perpendicular cross-sections contact nadir portions of the κ=1 movement locus in the principal cross-section.

Effect of the Invention

According to the present invention, it is possible to avoid superimposed flexion-induced bending stresses and tensile stresses caused by load torque arising at the long-axis locations on the ellipsoidal rim neutral curve of the outer gear on an axis-perpendicular cross-section having a deflection coefficient κ=1 (principal cross-section) in the outer gear of the strain wave gearing. Therefore, the transmission torque capacity of a strain wave gearing can be improved, without the need to adopt negative deflection flexing having a deflection coefficient κ<1 in a flat type strain wave gearing, and without the need to adopt negative deflection flexing having a deflection coefficient κ<1 along the entire tooth profile in a cup type or top-hat-type strain wave gearing.

MODE FOR CARRYING OUT THE INVENTION (Configuration of Strain Wave Gearing)

Figure 1:
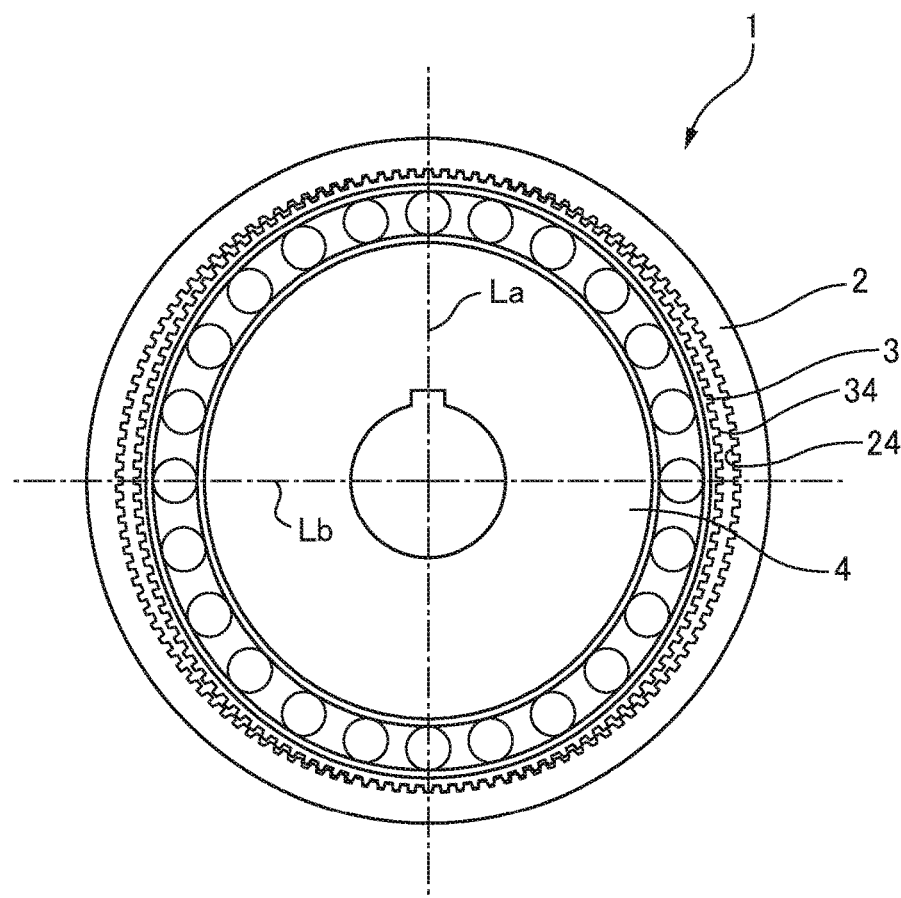
FIG. 1 is a simplified front view showing an example of a strain wave gearing in which the present invention is applied.
Figure 2:
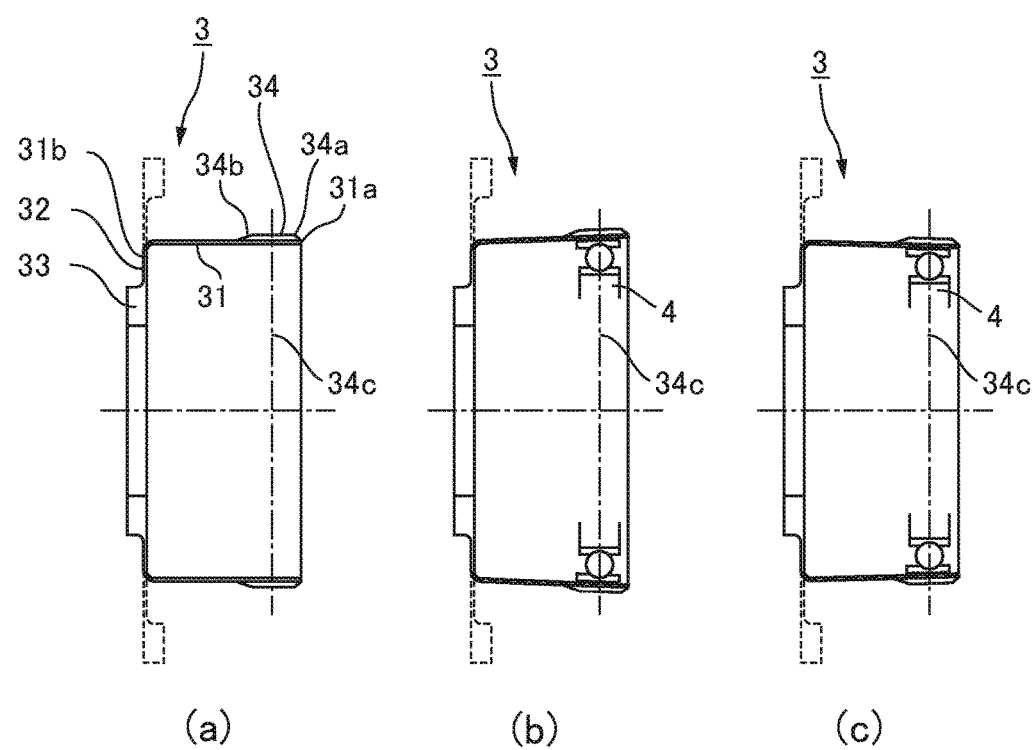
FIG. 2 is an illustrative representation of flexion conditions of an outer gear of cup and top hat profiles, where (a) shows a state prior to deformation, (b) shows a state of a cross-section including the long axis of an ellipsoidally deformed outer gear, and (c) shows a state of a cross-section including the short axis of an ellipsoidally deformed outer gear.

FIG. 1 is a front view of a strain wave gearing to which the present invention is directed. FIG. 2 (a) to (c) are cross-sectional views showing conditions in which an open portion of a flexible outer gear in the strain wave gearing is ellipsoidally flexed; FIG. 2 (a) shows a state prior to deformation, FIG. 2 (b) shows a cross-section including the long axis of an ellipsoidal curve subsequent to deformation, and FIG. 2 (c) shows a cross-section including the short axis of an ellipsoidal curve subsequent to deformation, respectively. In FIGS. 2 (a) to (c), the solid lines represent the diaphragm and boss sections of a flexible outer gear having a cup profile, and broken lines represent the diaphragm and boss sections of a flexible outer gear having a top hat profile.

As shown in the drawings, the strain wave gearing 1 has an annular, rigid inner gear 2, sometimes referred to as an internally toothed gear, a flexible outer gear 3, sometimes referred to as an externally toothed gear, arranged to the inside thereof, and a wave generator 4 of ellipsoidal profile, set at the inside. The inner gear 2 and the pre-deformation outer gear 3 are spur gears of module m. The difference in the number of teeth between the inner gear 2 and the outer gear 3 is 2n (n is a positive integer), and the circular outer gear 3 of the strain wave gearing 1 is ellipsoidally flexed by the ellipsoidal profile of the wave generator 4. Outer teeth 34 of the outer gear 3 (hereinafter, in some instances termed simply "teeth 34") and inner teeth 24 of the inner gear 2 (hereinafter, in some instances termed simply "teeth 24") mesh with one another near sections at either end in the direction of a long axis La of the outer gear 3 when ellipsoidally flexed.

As the wave generator 4 rotates, the location of meshing by the two gears 2, 3 moves in a circumferential direction, and the two gears 2, 3 rotate in relative fashion in accordance with the difference in the number of teeth of the gears. The outer gear 31 is equipped with a flexible cylindrical barrel part 31, a diaphragm 32 continuous with flare in a radial direction from a back end 31b which is one end of the cylindrical barrel part 31, a boss 33 continuous with the diaphragm 32, and the outer teeth 34, which are formed in an outer peripheral surface section at a front end opening 31a side at the other end of the cylindrical barrel part 31.

The ellipsoidal-profile wave generator 4 is set within an inner peripheral surface section of the outer tooth formation section of the cylindrical barrel part 31. The wave generator 4 causes the cylindrical barrel part 31 to undergo a gradual increase in flexion towards the outside or the inside the radial direction, towards the front opening 31 from the back end 31b at the diaphragm side. As shown in FIG. 2 (b), in a cross-section that includes the long axis La of the ellipsoidal curve (see FIG. 1), the amount of flexion towards the outside gradually increases in a substantially proportional relationship to the distance from the back end 31b to the front opening 31. As shown in FIG. 2 (c), in a cross-section that includes the short axis Lb of the ellipsoidal curve (see FIG. 1), the amount of flexion towards the outside gradually increases in a substantially proportional relationship to the distance from the back end 31b to the front opening 31a. The outer teeth 34 formed in an outer peripheral surface section at the front opening 31a side likewise experience a gradually increasing amount of flexion, substantially proportional to the distance from the back end 31b, going from an outer tooth inner end portion 34b to an outer tooth open end portion 34a in the tooth trace direction.

In an axis-perpendicular cross-section at any location in the tooth trace direction of the outer gear 34, a circle passing through the center in the thickness direction of the root rim of the outer gear 34 prior to ellipsoidal flexing is a rim neutral circle. On the other hand, an ellipsoidal curve passing through the center in the thickness direction of the root rim after ellipsoidal flexing is termed a "rim neutral curve." The amount of flexion w in the long axis direction with respect to the rim neutral circle at a long axis location on the ellipsoidal rim neutral curve is represented by 2$\kappa$mn, where is $\kappa$ is a deflection coefficient (a real number including 1).

Specifically, where the number of outer teeth 34 of the outer gear 3 is denoted by $Z_F$, the number of inner teeth 24 of the inner gear 2 by $Z_C$, and the gear ratio of the strain wave gearing 1 by R ($=Z_F/(Z_C-Z_F)=Z_F/2n$), the value ($mZ_F/R=2mn$) obtained by dividing the pitch circle diameter $mZ_F$ of the outer gear 3 by the gear ratio R is the amount of regular (standard) amount of flexion $w_0$ (=2mn) in the long axis direction. The strain wave gearing 1 is typically designed to induce flexion by the regular amount flexion $w_0$, in a region where the ball center of a wave bearing of the wave generator 4 is located in the tooth trace direction of the outer gear 3, and normally at a location in a center portion in the tooth trace direction of the outer gear.

The deflection coefficient $\kappa$ represents a value obtained by dividing the amount of flexion w in axis-perpendicular cross-sections in the tooth width direction of the outer gear 3, by the regular amount flexion. Consequently, in the outer gear 34, the deflection coefficient at the location at which the regular amount flexion $w_0$ is obtained is $\kappa=1$, the deflection coefficient at cross-sectional locations of lesser amounts of flexion w is $\kappa<1$, and the deflection coefficient at cross-sectional locations of greater amounts of flexion w is $\kappa>1$. A tooth profile with which the regular amount flexion $w_0$ ($\kappa=1$) is obtained in the outer gear 34 is termed a "non-deflection tooth profile," a tooth profile with which an amount of flexion less than the regular amount flexion ($\kappa<1$) is obtained is termed a "negative deflection tooth profile," and a tooth profile with which an amount of flexion greater than the regular amount flexion ($\kappa>1$) is obtained is termed a "positive deflection tooth profile." In the present example, an axis-perpendicular cross-section in a center portion in the tooth trace direction of the outer gear 34 is established as the principal cross-section 34c in which $\kappa=1$.

Figure 3A:
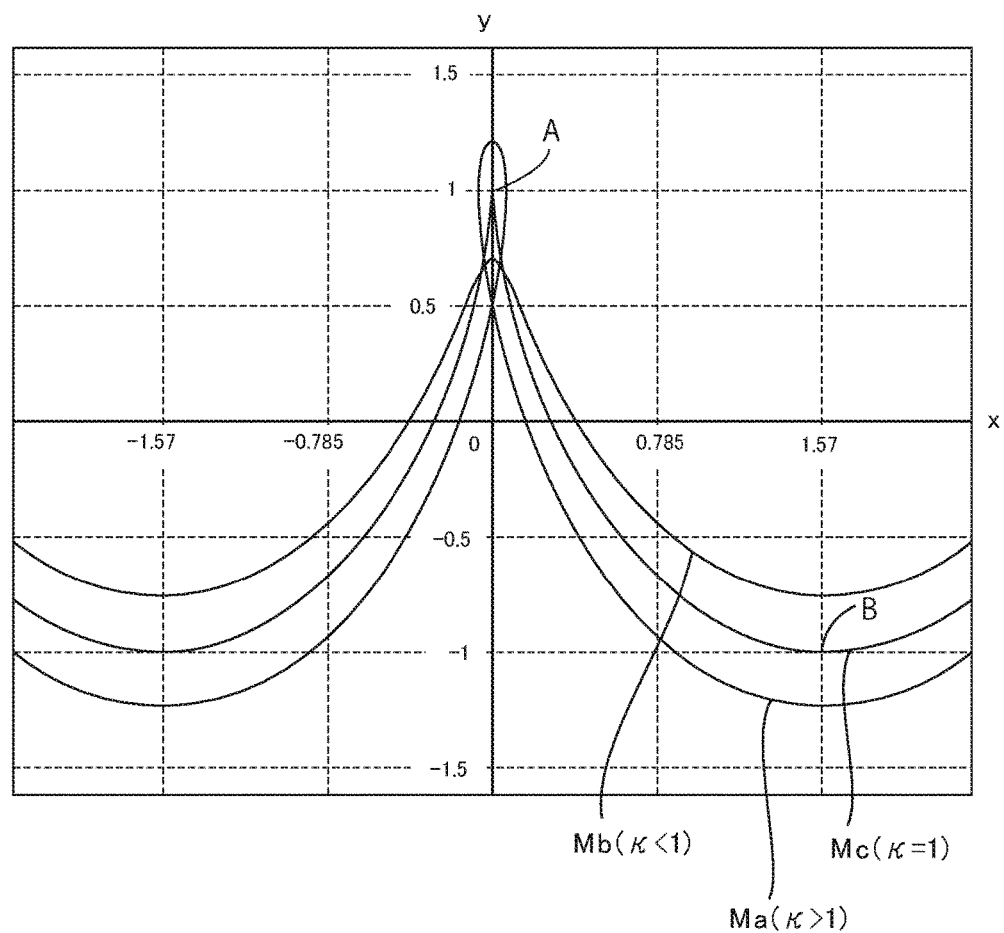
FIG. 3A is a graph showing movement loci of outer gear teeth with respect to inner gear teeth, obtained in a case in which meshing of teeth of the outer gear with respect to the inner gear is approximated by rack meshing, in an outer tooth inner end portion ($\kappa$<1), a principal cross-section ($\kappa$=1), and an outer tooth open end portion ($\kappa$>1) in the tooth trace direction of an outer gear.

FIG. 3A is diagram showing movement loci of the teeth 34 of the outer gear 3 with respect to the teeth 24 of the inner gear 2, obtained in a case in which relative motion of the gears 2, 3 of the strain wave gearing 1 is rack approximated. In the drawing, the x axis indicates the direction of translation of the rack, and the y axis indicates a direction perpendicular thereto. The origin of the y axis is the average position of amplitude of the movement loci. Curve Ma is a movement locus obtained at the outer tooth open end portion 34a, and curve Mb is a movement locus obtained at the outer tooth inner end portion 34b. Curve Mc is a movement locus obtained at any location from the outer tooth open end portion 34a to the outer tooth inner end portion 34b in the tooth trace direction, and in the present example is obtained in a center portion in the tooth trace direction. The axis-perpendicular cross-section at this location is referred to hereinafter as "principal cross-section 34." The movement locus of the teeth 34 of the outer gear 3 with respect to the teeth 24 of the inner gear is given by the following formulas.

$$x_{Fa}=0.5\ mn\ (\theta-\kappa\sin\theta)$$

$$y_{Fa}=\kappa mn\cos\theta$$

To simplify the description, the above formulas are represented by the following formula (1), where module m=1 and n=1 (difference in number of teeth $2n=2$).

$$x_{Fa}=0.5(\theta-\kappa\sin\theta)$$

$$y_{Fa}=\kappa\cos\theta \quad \text{(Formula 1)}$$

(Method for Forming Tooth Profile in Principal Cross-Section)

A tooth profile of the addendums of the inner teeth 24 in the principal cross-section 34c (deflection coefficient $\kappa=1$), afforded by rack approximation, will be described. The movement locus Mc obtained in the principal cross-section 34c in the outer gear 34 is utilized in order to specify the addendum profile of the inner teeth 24 in the principal cross-section 34c.

First, in the movement locus Mc in the principal cross-section 34c of FIG. 3A, a first curve AB for which the range of parameter $\theta$ is $\pi$ to 0 is selected. The location at which the parameter $\theta=\pi$ is point B, which is the nadir point of the movement locus Mc; point A at which the parameter $\theta=0$ is the apex point of the movement locus Mc. Subsequently, a $\lambda$-fold ($0<\lambda<1$) similarity transformation of the first curve AB with point B as the center of similarity gives a first similarity curve BC (see FIG. 4A). The first similarity curve BC is utilized as the addendum profile for the teeth 24 of the rigid inner gear 2. In the present example, $\lambda$ is 0.5.

The addendum profile for the teeth 24 of the inner gear 2 established in this manner is given by the following formula 2.

$$x_{Ca}=0.5\{(1-\lambda)\pi+\lambda(\theta-\kappa\sin\theta)\}$$

$$y_{Ca}=\kappa\{\lambda(1+\cos\theta)-1\} \quad \text{(Formula 2)}$$

where $0\leq\theta\leq\pi$.

Figure 4A:
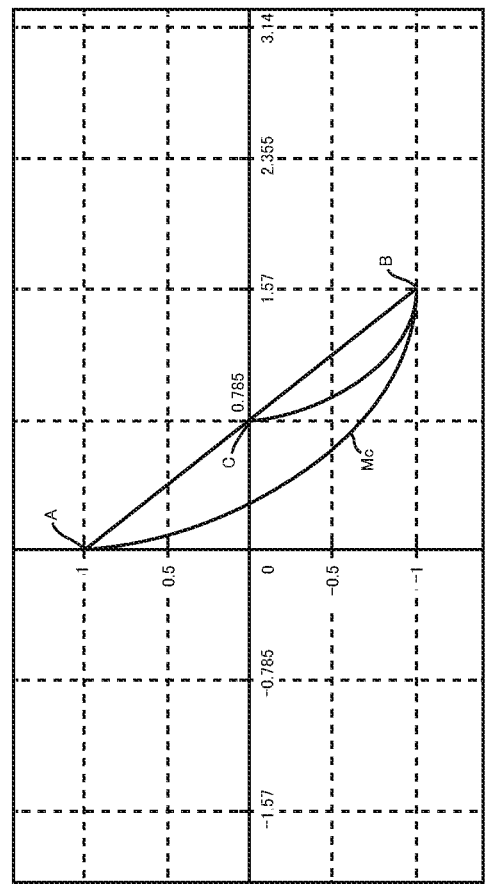
FIG. 4A is an illustrative representation of a tooth profile of an addendum of an inner gear.

Since $\lambda=0.5$ and $\kappa=1$, substituting these into formula 2 gives formula 2A. FIG. 4A shows a first similarity curve BC given by formula 2A.

(Inner Gear Addendum Profile)

$$x_{Ca}=0.25\ (\pi+\theta-\sin\theta)$$

$$y_{Ca}=0.5\ (-1+\cos\theta) \quad \text{(Formula 2A)}$$

where $0\leq\theta\leq\pi$.

Subsequently, the first similarity curve BC undergoes 180° rotation and $(1-\lambda)$-fold similarity transformation, with point C, which is the end point at the opposite side from point B in the similarity curve BC, as the center, to obtain a curve. This curve is given by the following formula 3.

$$x(\theta)=0.5\{(1-\lambda)(\pi-\theta+\kappa\sin\theta\}$$

$$y(\theta)=\kappa\{(\lambda-1)(1-\cos\theta)\} \quad \text{(Formula 3)}$$

where $0\leq\theta\leq\pi$.

Since $\lambda=0.5$ and $\kappa=1$, substituting these into formula 2 gives formula 3A.

$$x(\theta)=0.25(\pi-\theta+\sin\theta)\}$$

$$y(\theta)=0.5(1-\cos\theta) \quad \text{(Formula 3A)}$$

where $0\leq\theta\leq\pi$.

(Outer Gear Addendum Profile)

Figure 4B:
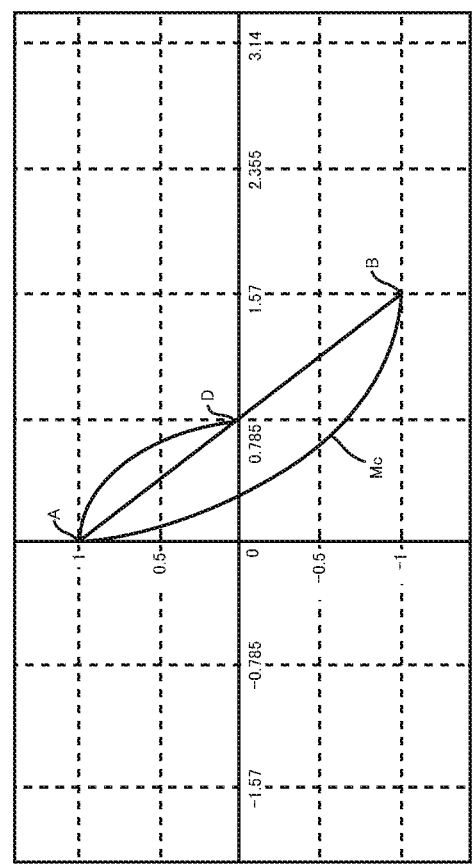
FIG. 4B is an illustrative representation of a tooth profile of an addendum in a principal cross-section of an outer gear.

Here, the addendum profile of the outer gear 34 is specified by the following formula 3B. FIG. 4B shows a curve AD given by formula 3B.

$$x_{Fa}=0.25(\pi-\theta\sin\theta-\varepsilon\cos(\theta/2))$$

$$y_{Fa}=0.5(1-\cos\theta) \quad \text{(Formula 3B)}$$

where $0<\varepsilon\leq0.1$, and $0\leq\theta\leq\pi$

In formula 3B, meshing of the outer gear 3 with the inner gear 2 at the long axis La of the ellipsoidal rim neutral curve is eliminated by introducing the term $\varepsilon\cos(\theta/2)$ so that, at the long axis La, only bending stress due to ellipsoidal flexion is present, with tensile stress due to transmission torque load gradually increasing at positions further away from the long axis La.

(Example of Inner Gear Dedendum Profile)

Figure 4C:
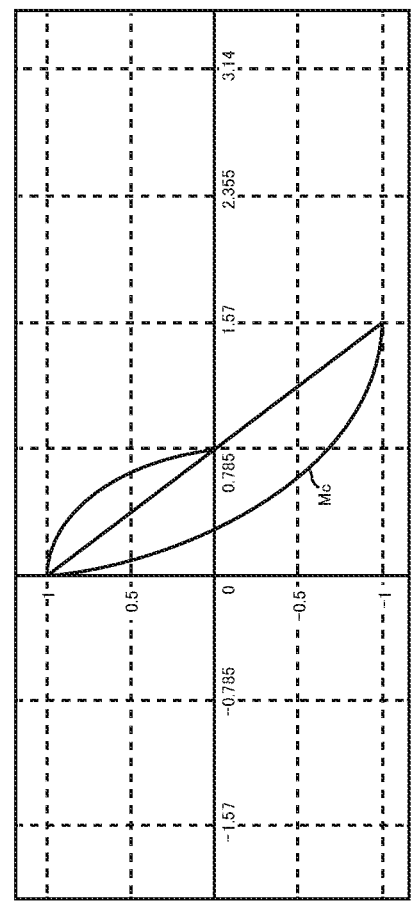
FIG. 4C is an illustrative representation of an example of a tooth profile of a dedendum of an inner gear.

The dedendum profile of each of the two gears 2, 3 may be any profile that does not give rise to interference with the addendum profile of the counterpart gear. For example, the dedendum profile of the inner gear 2 can be such that a curve created in the inner gear 2 during the interval that the addendum profile of the outer gear 3 moves from the apex point to the nadir point of the movement locus Mc is defined as the dedendum profile of maximum tooth thickness of the inner gear 2. This dedendum profile is given by the following formula 4. FIG. 4C shows a dedendum profile curve given by formula 4.

$$x_{Ca}=0.25\ (\pi-\theta+\sin\theta)$$

$$y_{Ca}=0.5(1-\cos\theta)\} \quad \text{(Formula 4)}$$

where $0\leq\theta\leq\pi$.

Figure 4D:
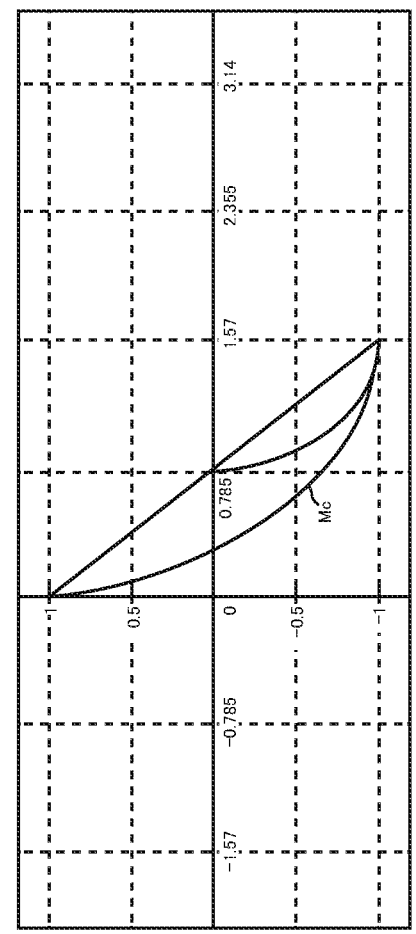
FIG. 4D is an illustrative representation of an example of a tooth profile of a dedendum of an outer gear.

Likewise, the curve that the addendum profile of the inner gear 2 creates in the outer gear 3 during the interval that the addendum profile of the outer gear 3 moves from the apex point to the nadir point of the movement locus Mc can be defined as the dedendum profile of maximum tooth thickness of the outer gear 3. This dedendum profile is given by the following formula 5. FIG. 4D shows a dedendum profile curve given by formula 5.

$$x_{Fa} = \pi/2 - \varepsilon/2 - 0.25\ (\pi - \theta + \sin\theta - \varepsilon\cos(\theta/2))$$

$$y_{Fa} = -0.5\ (1-\cos\theta)\}$$ (Formula 5)

where $0 \leq \theta \leq \pi$.

Figure 5:
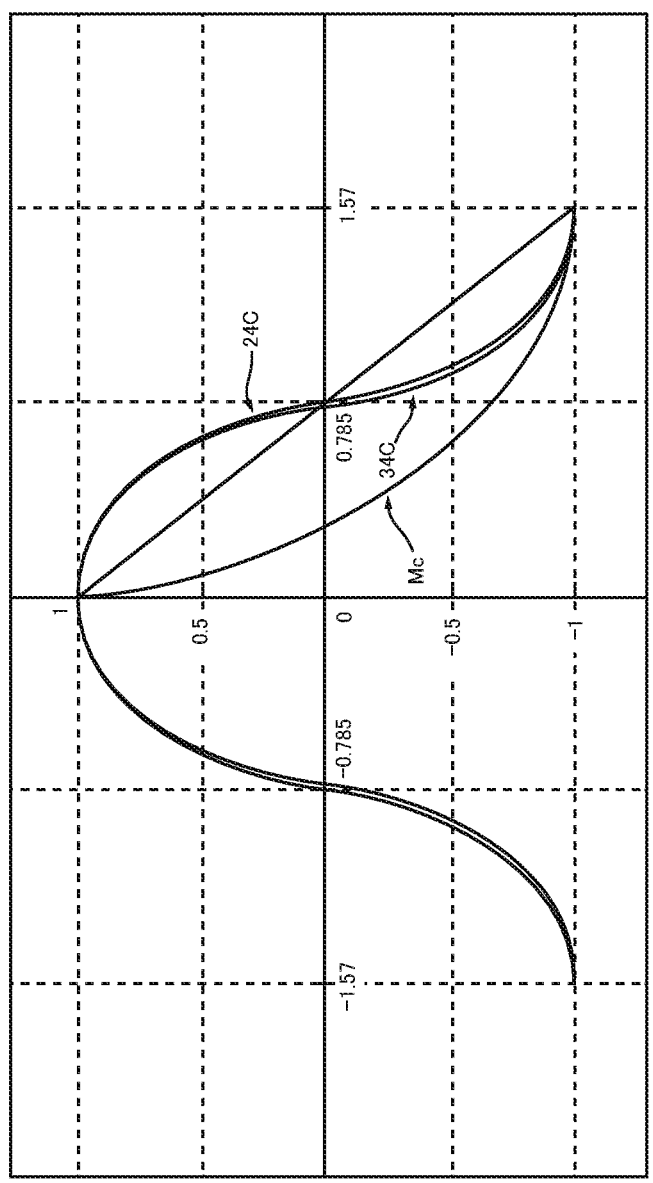
FIG. 5 is an illustrative representation of tooth profiles of an outer gear and an inner gear in a principal cross-section.

FIG. 5 shows an outer tooth profile 34C and an inner tooth profile 24C defined by meshing of the aforementioned individual tooth profiles in the principal cross-sections 34c of the outer gear and the inner gear.

(Tooth Profiles in Axis-Perpendicular Cross-Sections Other than Principal Cross-Sections)

In a flat type strain wave gearing, the tooth profiles of axis-perpendicular cross-sections in the tooth trace direction of the inner gear 2 and the outer gear 3 are the same as the tooth profiles in the principal cross-section 34c established as described above.

By contrast, in a cup-type strain wave gearing or a top hat-type strain wave gearing, tooth profiles of axis-perpendicular cross-sections in the tooth trace direction of the inner gear 2 are identical to the tooth profile at the location of the principal cross-section 34c established as described above. However, tooth profiles of axis-perpendicular cross-sections other than the principal cross-section 34c in the tooth trace direction of the outer gear 3 are shifted profiles in which the tooth profile of the principal cross-section 34c has been subjected to shifting according to the amount of flexion of each axis-perpendicular cross-section.

Specifically, the tooth profiles of axis-perpendicular cross-sections in the tooth trace direction from the principal cross-section 34c to the outer teeth open end portion 34a of the outer gear 3 are tooth profiles obtained when the outer tooth profile 34C of the principal cross-section 34c undergoes shifting such that apex portions of $\kappa>1$ movement loci described by the outer teeth 34 in axis-perpendicular cross-sections contact an apex portion of the $\kappa=1$ movement locus in the principal cross-section 34c. The tooth profiles of axis-perpendicular cross-sections in the tooth trace direction from the principal cross-section 34c to the outer teeth inner end portion 34b of the outer teeth 34c are tooth profiles obtained when the outer tooth profile 34C of the principal cross-section 34c undergoes shifting such that nadir portions of $\kappa<1$ movement loci described by the outer teeth 34 in axis-perpendicular cross-sections contact a nadir portion of the $\kappa=1$ movement locus in the principal cross-section 34c.

Figure 3B:
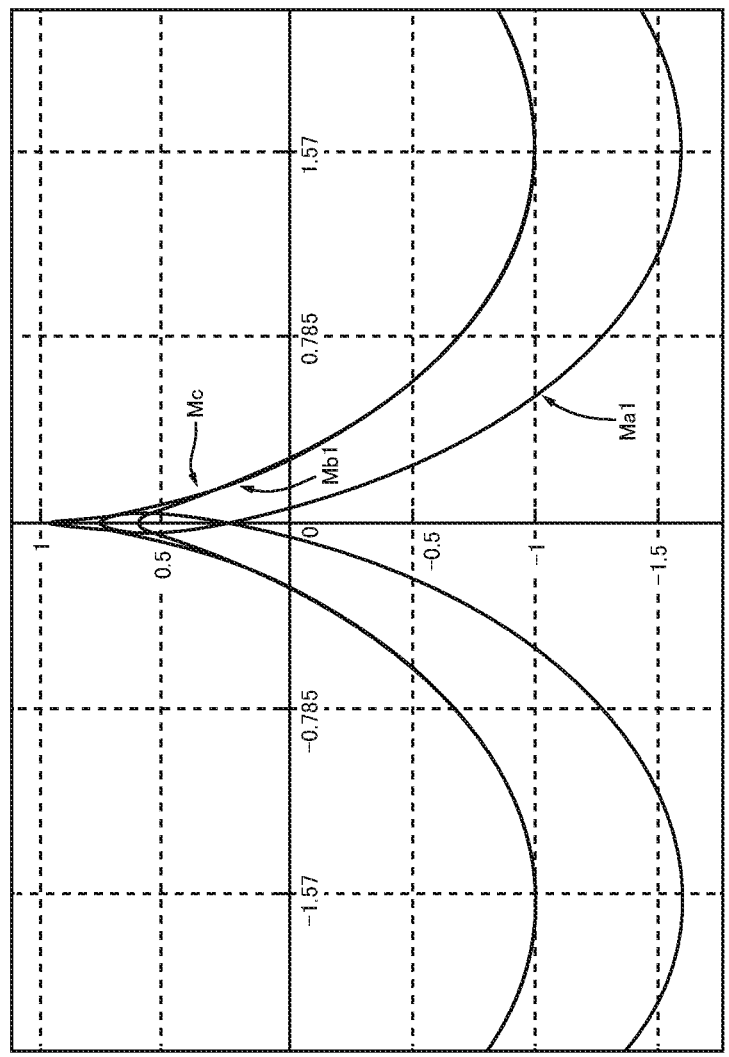
FIG. 3B is a graph showing movement loci of outer gear teeth with respect to inner gear teeth, obtained in a case in which meshing of teeth of the outer gear with respect to the inner gear is approximated by rack meshing, in an outer tooth inner end portion ($\kappa$<1), a principal cross-section ($\kappa$=1) trace direction of an outer gear after being subjected to shifting.

In specific terms, tooth profiles of cross-sections in the tooth trace direction, other than the principal section, in the outer gear 3 are established as follows. As shown in FIG. 3B, in axis-perpendicular cross-sections at locations from the principal cross-section 34c to the outer teeth open end portion 34a, in which the deflection coefficient is $\kappa>1$, the amount of deflection h of the teeth 34 of the outer gear 3 is given by the following formulas, such that an apex portion of a movement locus Ma1 derived by rack approximation of the teeth 34 of the outer gear 3 with respect to the teeth 24 of the inner gear contacts a movement locus Mc in the principal cross-section 34c.

$$h = \lambda(\kappa)(\kappa - 1)$$

As noted above, a rack-approximated movement locus of the teeth 34 of the outer gear 3 with respect to the teeth 24 of the inner gear 2 in axis-perpendicular cross-sections of the outer gear in which the deflection coefficient $\kappa$ is 1 or greater is indicated by the following formula.

$$x_{Fa} = 0.5\ (\theta - \kappa\sin\theta)$$

$$y_{Fa} = \kappa\cos\theta$$ (Formula A)

A pressure angle $\alpha_\kappa$ of a tangent to a movement locus, with respect to a point on the movement locus, is indicated by the following formula.

$$\tan\alpha_\kappa = 0.5(1 - \kappa\cos\theta_\kappa)/\kappa\sin\kappa_\kappa$$ (Formula B)

A pressure angle $\alpha_1$ of a tangent with respect to a point on the $\kappa=1$ movement locus is indicated by the following formula.

$$\tan\alpha_1 = 0.5(1-\cos\theta_1)/\sin\theta_1$$ (Formula C)

The pressure angles are thereby equated to obtain the following formula.

$$(1-\kappa\cos\theta_\kappa)/\kappa\sin\theta_\kappa - (1-\cos\kappa_1)/\sin\theta_1 = 0$$ (Formula D)

Next, the x coordinates of the contact points are equated to obtain the following formula.

$$\theta_\kappa - \kappa\sin\theta_\kappa - \theta_1 + \sin\theta_1 = 0$$ (Formula E)

Here, by simultaneously solving formula D and formula E, and calculating $\theta_\kappa$ and $\theta_1$, the amount of shifting h is calculated from the following formula.

$$h = \kappa\cos\theta_\kappa - \cos\theta_1$$ (Formula F)

Next, in axis-perpendicular cross-sections situated at locations from the principal cross-section 34c to the outer teeth inner end portion 34b of the outer gear 3 and in which the deflection coefficient is $\kappa<1$, the teeth 34 of the outer gear 3 are shifted such that a nadir portion of a movement locus Mb1 of the teeth 34 of the outer gear 3 with respect to the teeth 24 of the inner gear 2 contacts a nadir portion of the movement locus Mc in the principal cross-section 34c, as shown in FIG. 3B. The magnitude of shifting at this time is given by the following formula.

$$h = \kappa - 1$$

Figure 6:
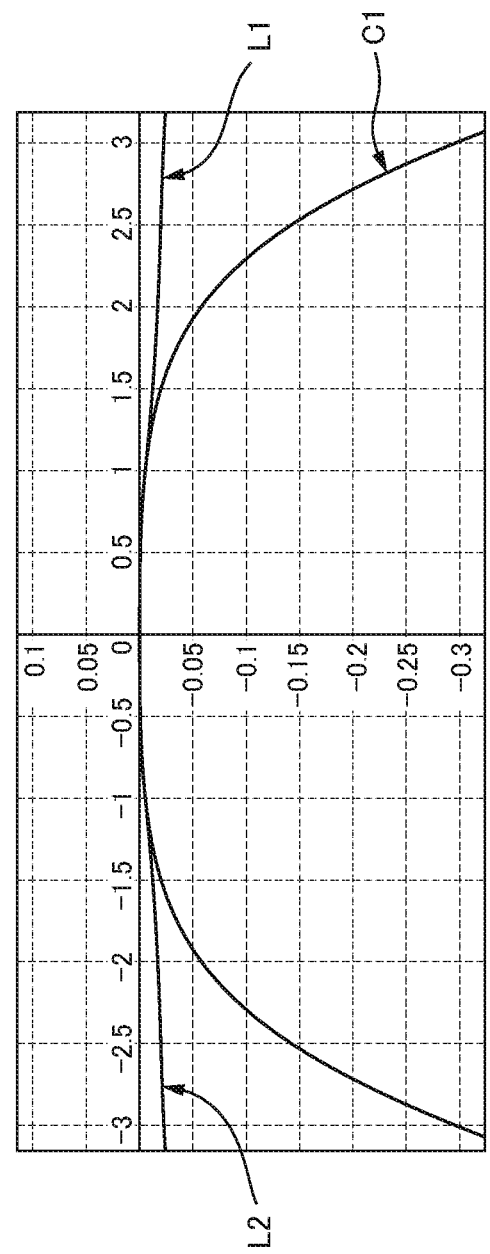
FIG. 6 is a graph showing an example of the amount of shifting near a principal cross-section in the tooth trace direction of an outer gear.

FIG. 6 is a graph showing an example of the amount of shifting near a principal cross-section in the tooth trace direction of the outer gear 3. The horizontal axis in the drawing indicates the distance from the center portion in the tooth trace direction of the outer teeth 34 (the principal cross-section 34c), and the vertical axis indicates the amount of shifting h. The amount of shifting h is indicated by straight shifting lines L1, L2 of identical slope. The straight shifting line L1 indicates the amount of shifting from the principal cross-section 34 to the outer tooth open end portion 34a, and the straight shifting line L2 indicates the amount of shifting from the principal cross-section 34 to the outer tooth inner end portion 34b.

A quartic curve C1 having the principal cross-section 34c as the apex point and contacting the straight shifting lines L1, L2 is also shown in FIG. 6. When amounts of shifting in axis-perpendicular cross-sections are determined on the basis of this quartic curve C1, a substantially flat portion is formed in a center portion in the tooth trace direction that includes the principal cross-section 34c of the outer gear 34. In so doing, smoothly varying shifting is ensured, and dimension management during cutting of the outer gear 3 is facilitated.

Figure 7:
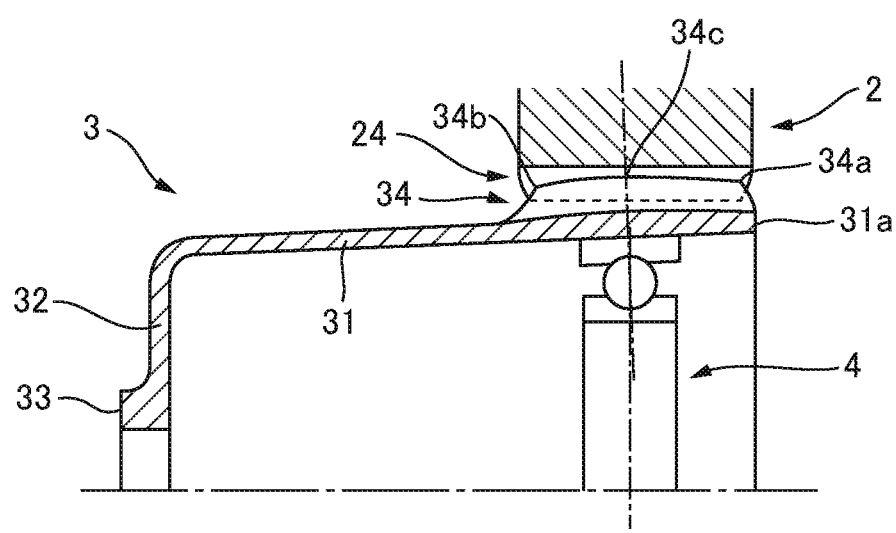
FIG. 7 is an illustrative representation of tooth profile contours in the tooth trace direction of an outer gear having undergone shifting.

FIG. 7 is an illustrative representation of the tooth profile outlines of the inner gear 24 and the outer gear 34, in which the tooth profile outline of the outer gear in the tooth trace direction has undergone shifting in the aforedescribed manner. In the drawing, a state in a cross-section that includes the long axis with the gears 2, 3 in a meshed state (state of maximum-depth meshing) is shown. In a center portion in the tooth trace direction that includes the principal cross-section 34c, the tooth profile outline in the tooth trace direction of the outer gear 34 is specified by the aforedescribed quartic curve C1, the tooth profile outline in a section from this center portion to the outer tooth open end portion 34a is defined by the straight shifting line L1, and the tooth profile outline in a section from this center portion to the outer tooth inner end portion 34b is defined by the straight shifting line L2.

Figure 8:
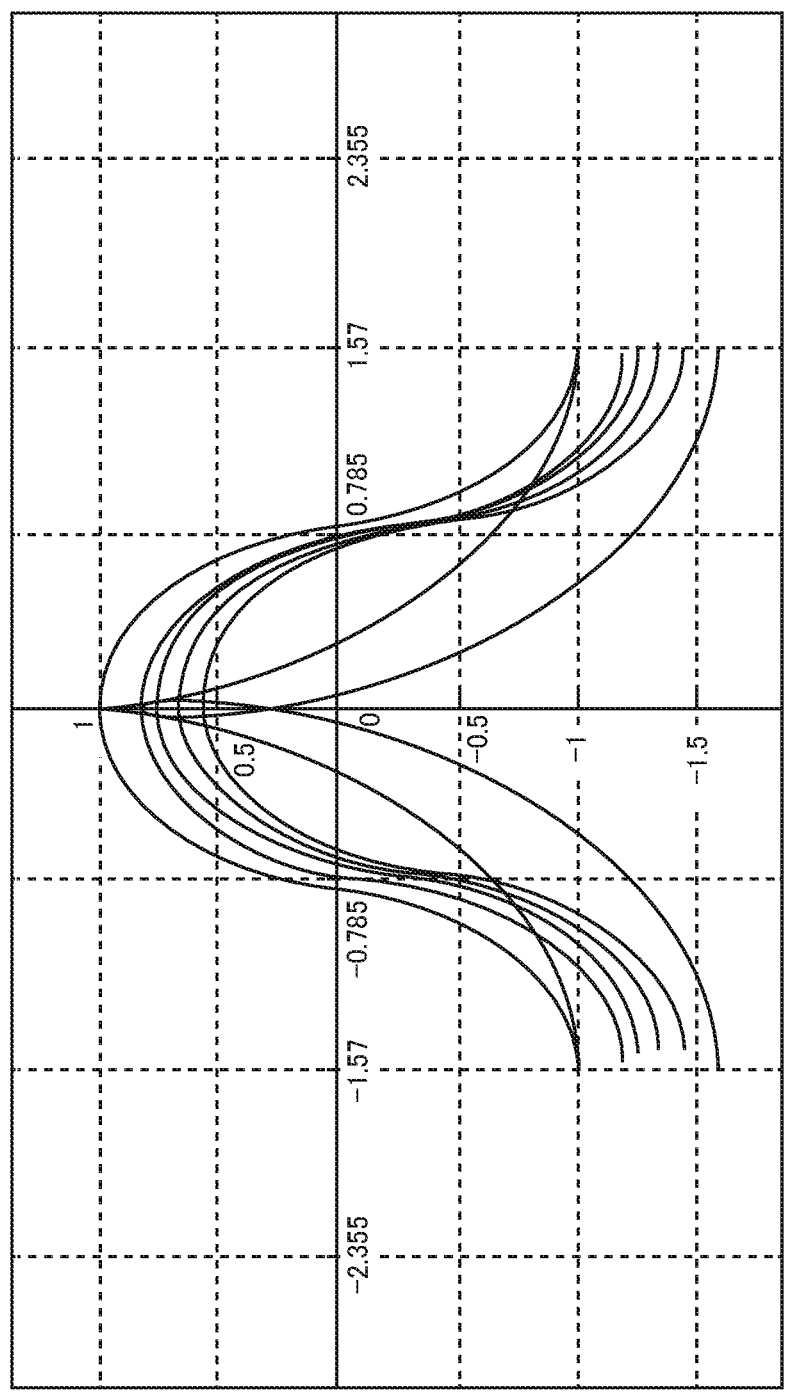
FIG. 8 is an illustrative representation of meshing of outer gear teeth with respect to inner gear teeth in an outer tooth open end portion of an outer gear.
Figure 9:
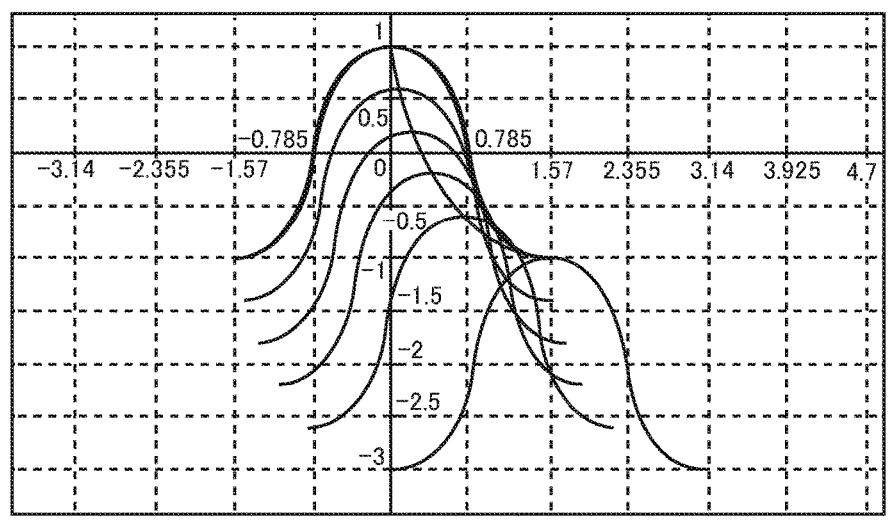
FIG. 9 is (a) an illustrative representation of meshing of outer gear teeth with respect to inner gear teeth in a principal cross-section of an outer gear, and (b) a partial enlarged view thereof.
Figure 9:
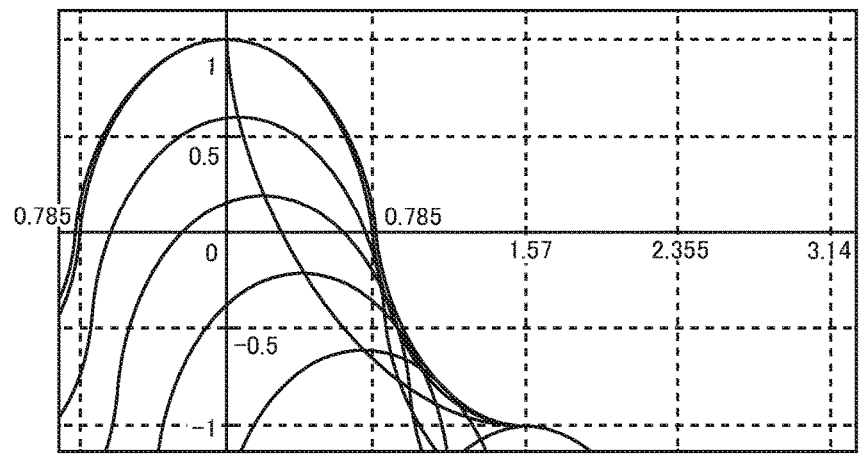
Figure 10:
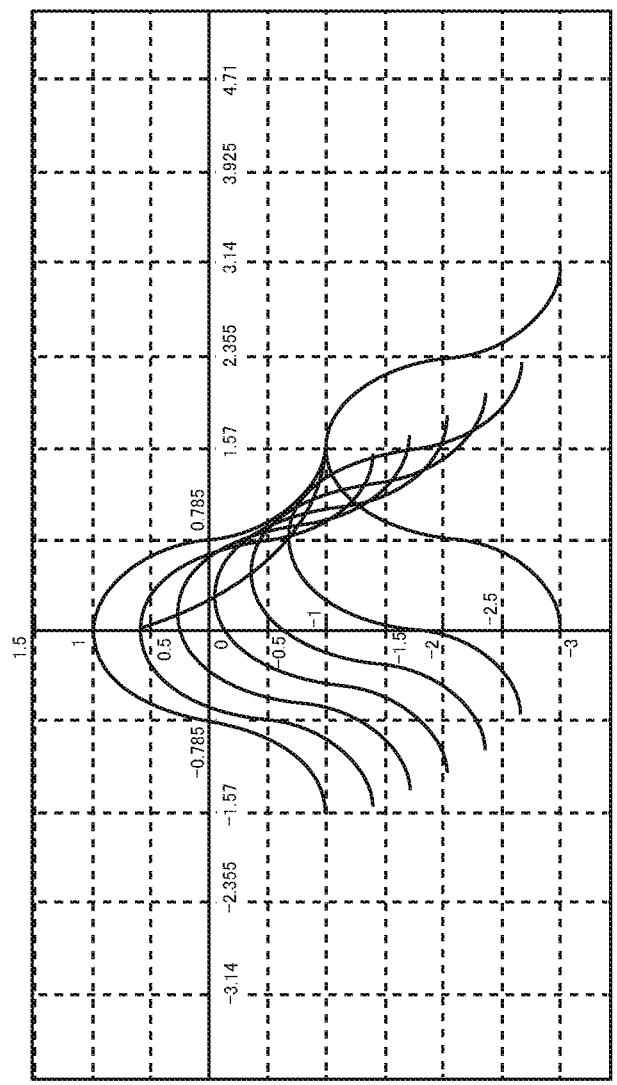
FIG. 10 is an illustrative representation of meshing of outer gear teeth with respect to inner gear teeth in an outer tooth open end portion of an outer gear.

FIGS. 8-10 are descriptive diagrams showing, by rack approximation, the condition of meshing of the outer teeth 34 with respect to the inner teeth 24 having tooth profiles established in the aforedescribed manner. FIG. 8 shows meshing of the outer teeth 34 with respect to the inner teeth 24 in the outer tooth open end portion 34a of the outer gear 34. FIG. 9 (*a*) shows analogous meshing in the principal cross-section 34c of the outer gear 34, and FIG. 9 (*b*) is a partial enlarged view thereof. FIG. 10 shows analogous meshing in the outer tooth inner end portion 34b of the outer gear 34.

As will be understood from the drawings, while approximate, at locations from the outer tooth open end portion 34a to the outer tooth inner end portion 34b of the outer gear 3, the tooth profiles make useful contact, centered on the principal cross-section 34c.

As described above, in the present example, by making necessary corrections to the tooth profile of the flexible outer gear 3 of the strain wave gearing 1, in an axis-perpendicular cross-section having a deflection coefficient of κ=1 (the principal cross-section 34c), the location of meshing of the outer gear 3 with respect to the inner gear 2 in the outer gear 3 is moved away from the location of the long axis La of the ellipsoidal rim neutral curve of the outer gear 3, and gradual meshing commences. In so doing, superimposition of bending stress produced by flexion, and tensile stress caused by load torque, arising at long axis locations of the ellipsoidal rim neutral curve of the outer gear as encountered in the prior art, can be avoided. Thus, separation of the two stresses (bending stress and tensile stress) can be achieved, whereby the transmission torque capacity of the strain wave gearing can be improved, without the need to adopt negative deflection flexing having a deflection coefficient of κ<1 in a flat type strain wave gearing, or to adopt negative deflection flexing having a deflection coefficient of κ<1 along the entire tooth profile in a cup type or top-hat-type strain wave gearing.

The invention claimed is:

1. A strain wave gearing comprising:
a rigid internally toothed gear, a flexible externally toothed gear arranged coaxially to an inside of the rigid internally toothed inner gear, and a wave generator fitted inside the flexible externally toothed gear;
the externally toothed gear being flexed into an ellipsoidal shape by the wave generator, outer teeth of the ellipsoidally flexed externally toothed gear meshing with inner teeth of the internally toothed gear in proximity to sections at opposite ends of the ellipsoidally flexed externally toothed gear in a long axis direction thereof;
the internally toothed gear, and the externally toothed gear, are both spur gears of module m;
a number of teeth of the externally toothed gear being fewer by 2n than a number of teeth of the internally toothed gear, where n is a positive integer;
at a location along the long axis on an ellipsoidal rim neutral curve of the externally toothed gear in an axis-perpendicular cross-section at a predetermined location along a tooth trace direction of the externally toothed gear, radial flexion with respect to a rim neutral circle prior to flexion being 2κmn, where κ is a deflection coefficient, and where an axis-perpendicular cross-section established at a predetermined location along the tooth trace direction of the externally toothed gear is a principal cross-section, the principal cross-section being a non-deflection cross-section in which the deflection coefficient κ=1;
a movement locus where the deflection coefficient κ=1 by the teeth of the externally toothed gear with respect to the internally toothed gear, and where meshing of the externally toothed gear with respect to the internally toothed gear in the principal cross-section, comprises rack meshing;
a tooth profile of an addendum of the internally toothed gear being specified by the following formula a, $$x_{Ca} = 0.25 \, mn \, (\pi + \theta - \sin\theta)$$

$$y_{Ca} = 0.5 \, mn \, (-1 + \cos\theta) \quad \text{(formula a)}$$

where $0 \leq \theta \leq \pi$;
a tooth profile of an addendum of the externally toothed gear being specified by the following formula b, $$x_{Fa} = 0.25 \, mn \, (\pi - \theta + \sin\theta - \varepsilon \, \cos(\theta/2))$$

$$y_{Fa} = 0.5 \, mn \, (1 - \cos\theta) \quad \text{(formula b)}$$

where $0 \leq \varepsilon \leq 0.1$ and $0 \leq \theta \leq \pi$; and
the tooth profiles of dedenda of each of the gear and the externally toothed gear being set to any shape that does not interfere with the tooth profile of the addendum of the other gear.

2. The strain wave gearing according to claim 1, wherein a dedendum profile of the internally toothed gear at a location of its maximum thickness is given by the following formula c, $$x_{Ca} = 0.25 \, mn \, (\pi - \theta + \sin\theta)$$

$$y_{Ca} = 0.5 \, mn \, (1 - \cos\theta)\} \quad \text{(Formula c)}$$

where $0 \leq \theta \leq \pi$; and
a dedendum profile of the externally toothed gear at a location of its maximum tooth thickness is given by the following formula d, $$x_{Fa} = mn \, (\pi/2 - \varepsilon/2 - 0.25(\pi - \theta + \sin\theta - \varepsilon \, \cos(\theta/2)))$$

$$y_{Fa} = -0.5 \, mn \, (1 - \cos\theta) \quad \text{(Formula d)}$$

where $0 \leq \theta \leq \pi$.

3. The strain wave gearing according to claim 1, wherein the tooth profiles of axis-perpendicular cross-sections along the tooth trace direction of the internally toothed gear are defined by the above formula a; and
the tooth profiles of axis-perpendicular cross-sections in the tooth trace direction of the externally toothed gear are defined by the above formula b.

4. The strain wave gearing according to claim 1, wherein the externally toothed gear is equipped with a flexible cylindrical barrel part, and a diaphragm extending in a radial direction from a back end of the cylindrical barrel part, the outer teeth being formed in an outer peripheral section at a front open end side of the cylindrical barrel part;

the amount of flexion of the outer teeth changes relative to a distance from an end of the outer teeth adjacent the diaphragm to an open end of the outer teeth at the front end opening side in the tooth trace direction;

the principal cross-section is located at a center along the tooth-trace-direction between the outer teeth open end portion and the outer teeth inner end portion of the outer teeth;

the tooth profile of the externally toothed gear in the principal cross-section is defined by an addendum profile that is defined by the above formula b; and the tooth profile in axis-perpendicular cross-sections, other than the principal cross-section, in the tooth trace direction in the externally toothed gear are shifted profiles in which the tooth profile of the principal cross-section is subjected to shifting according to an amount of flexion of each of the axis-perpendicular cross-sections, wherein the tooth profiles of axis-perpendicular cross-sections along the tooth trace direction, from the principal cross-section to the outer tooth open end of the externally toothed gear, are obtained by subjecting the tooth profile of the principal cross-section to shifting, in such a way that apex portions of the movement locus where the deflection coefficient $\kappa>1$ described by the tooth profile in each of the axis-perpendicular cross-sections contact apex portions of the movement locus where the deflection coefficient $\kappa>1$ in the principal cross-section; and the tooth profiles of axis-perpendicular cross-sections of the tooth trace direction, from the principal cross-section to the outer tooth inner ends of the outer gear, are obtained by subjecting the tooth profile of the principal cross-section to shifting, in such a way that nadir portions of the movement locus where the deflection coefficient $\kappa>1$ described by the tooth profiles in the axis-perpendicular cross-sections contact nadir portions of the movement locus where the deflection coefficient $\kappa>1$ in the principal cross-section.

5. The strain wave gearing according to claim 4, wherein the tooth profiles of axis-perpendicular cross-sections of the tooth trace direction, from the principal cross-section to the outer tooth open end of the externally toothed gear, are obtained by shifting the tooth profile of the principal cross-section, the amount of shifting being defined by the following formula, $$h = \kappa \cos \theta_\kappa - \cos \theta_1,$$

where values of $\theta_\kappa$ and $\theta_1$ are solutions of the following simultaneous equations, $$(1-\kappa \cos \theta_\kappa)/\kappa \sin \theta_\kappa - (1-\cos \theta_1)/\sin \theta_1 = 0$$

$$\theta_\kappa - \kappa \sin \theta_\kappa - \theta_1 + \sin \theta_1 = 0.$$

6. The strain wave gearing according to claim 5, wherein the tooth profiles of axis-perpendicular cross-sections along the tooth trace direction, from the principal cross-section to the outer tooth inner ends of the outer gear, are obtained by shifting the tooth profile of the principal cross-section, the amount of shifting being defined by the following formula, $$h = \kappa - 1.$$

\* \* \* \* \*